United States Patent [19]

Loewen

[11] Patent Number: 5,609,384
[45] Date of Patent: Mar. 11, 1997

[54] FAIRING

[76] Inventor: Gordon Loewen, 3500 Shuswap Ave., Richmond, B.C., Canada, V7E 2A8

[21] Appl. No.: 667,201

[22] Filed: Jun. 20, 1996

[51] Int. Cl.$^6$ .................................................. B62D 35/00
[52] U.S. Cl. ..................................... 296/180.4; 296/180.1
[58] Field of Search ............................ 296/180.1–180.5; 180/903

[56] References Cited

U.S. PATENT DOCUMENTS

| | | |
|---|---|---|
| D. 354,726 | 1/1995 | Fitzgerald et al. ...................... D12/181 |
| 4,142,755 | 3/1979 | Keedy . |
| 4,257,640 | 3/1981 | Wiley . |
| 4,257,641 | 3/1981 | Keedy . |
| 4,451,074 | 5/1984 | Scanlon . |
| 4,486,046 | 12/1984 | Whitney . |
| 4,640,541 | 2/1987 | FitzGerald . |
| 4,746,160 | 5/1988 | Wiesemeyer ...................... 296/180.4 X |
| 4,818,015 | 4/1989 | Scanlon ............................... 296/180.1 |
| 5,277,444 | 1/1994 | Stropkay ................................ 280/848 |
| 5,280,990 | 1/1994 | Rinard .............................. 296/180.4 X |

*Primary Examiner*—Dennis H. Pedder
*Attorney, Agent, or Firm*—Townsend and Townsend and Crew LLP

[57] ABSTRACT

A fairing for use on a trailer. The trailer has a first member of the first edge that is hingedly attached to the trailer of the first edge. A second member has a first edge also hingedly attached to the trailer at that edge. A third member has a first edge hingedly attached to the trailer and arranged adjacent to the second member. The third member is telescopically receivable within the second member. The fairing is arranged along the lower edge of a trailer, adjacent the wheel.

7 Claims, 4 Drawing Sheets

FAIRING

FIELD OF THE INVENTION

This invention relates to a fairing.

DESCRIPTION OF THE PRIOR ART

It is well known that improving the aerodynamics of a vehicle improves many aspects of its performance, particularly acceleration, top speed and fuel economy.

Modern cars are quite aerodynamically efficient but limited progress has been made with heavy duty vehicles, trucks and the like. This is unfortunate principally because the fuel consumption by such a vehicle is high and any improvement in its aerodynamics performance is of great significance to truckers in improving fuel economy. Acceleration and speed are, in general, of little interest in trucking. Existing performance in these fields is considered adequate. However fuel consumption is a major concern. It has recently been suggested that higher fuel prices, coupled with intense competition, may have the effect of closing down certain carriers.

There have been attempts to improve the fuel consumption in trucks but it has been of limited success. Generally convex bodies mounted over the cab to reduce the deleterious affects of the flat end of the trailer have been tried with some success but very little else appears to have been done in the matter of making trucks more aerodynamic.

Prior art known to applicant includes U.S. Pat. No. 4,257,640 to Wiley issued Mar. 24, 1981; U.S. Pat. No. 4,257,641 to Keedy issued Mar. 24, 1991; U.S. Pat. No. 4,142,753 to Keedy issued Mar. 6, 1979; U.S. Pat. No. 4,451,074 to Scanlon issued May 29, 1994; U.S. Pat. No. 4,486,046 to Whitney et al issued Dec. 4, 1994; U.S. Pat. No. 4,640,541 to FitzGerald et al issued Feb. 3, 1987; U.S. Pat. No. 4,746,160 to Wiesemeyer issued May 24, 1988; U.S. Pat. No. 4,818,015 to Scanlon issued Apr. 4, 1989; U.S. Pat. No. 5,277,444 to Stropkay issued Jan. 11, 1994 and U.S. Design Pat. No. 354,726 to Fitzgerald et al issued Jan. 24, 1995.

Of the above patents Wiley teaches a drag reducer for gaps in a land vehicle, the gap occurring between a truck semi-trailer and the like and the towing vehicle. Keedy in the '641 patent is an aerodynamic drag reducer that forms an integral part of the rear end of a vehicle; Keedy in the '753 patent again is to a vehicle drag reducer that extends between the truck tractor and the trailer and to a drag reducer shield that encloses the rear end of the trailer. Scanlon in the '074 patent teaches a collapsible airfoil to reduce wind resistance that fits on the front and rear of a vehicle. Whitney et al teaches an airstream deflector assembly that mounts on the underside of a large vehicle to reduce drag. FitzGerald et al in the '541 patent teaches an air deflector from the rear of a vehicle that reflects there is a fairing that is suspended beneath the truck or trailer body immediately in front of the rear wheels and extends across the width of the body. Preferably the device is formed with a plurality of grooves to ensure that air is deflected between the wheels. Wiesemeyer is to a highway truck with a semi-trailer and teaches streamlined skirts on both sides of the vehicle that extend immediately above ground level, between the wheels. Scanlon in the '015 patent is to an airfoil again mounted on the front and the rear of a vehicle. It can be moved to and from a collapsed, stored position to a useful position. Stropkay teaches a spray control device that acts to direct water spray in such a way that it does not impede the vision of a driver and Fitzgerald in the Design patent is to an ornamental design for a pair of trailer skirting air deflectors.

SUMMARY OF THE INVENTION

The present invention seeks to improve on the prior art. Tests carried out so far have achieved impressive results in fuel economy. Furthermore the presence of the fairings according to the present invention is not a problem in carrying out truck or trailer maintenance as the fairings can be moved easily in a plurality of directions.

Accordingly, in a first aspect, the present invention is a fairing for use on a trailer and comprising:

a first member having a first edge hingedly attached to said trailer at said first edge;

a second member having a first edge hingedly attached to said truck at said first edge;

a third member being telescopically received within said second member, said fairing being arranged along the lower edge of the trailer, adjacent the wheels.

The fairing may be mounted to the trailer I-beam by a mounting rail.

BRIEF DESCRIPTION OF THE DRAWINGS

The invention is illustrated, by way of example, in the drawings in which.

DESCRIPTION OF THE PREFERRED EMBODIMENTS

Figure 1:
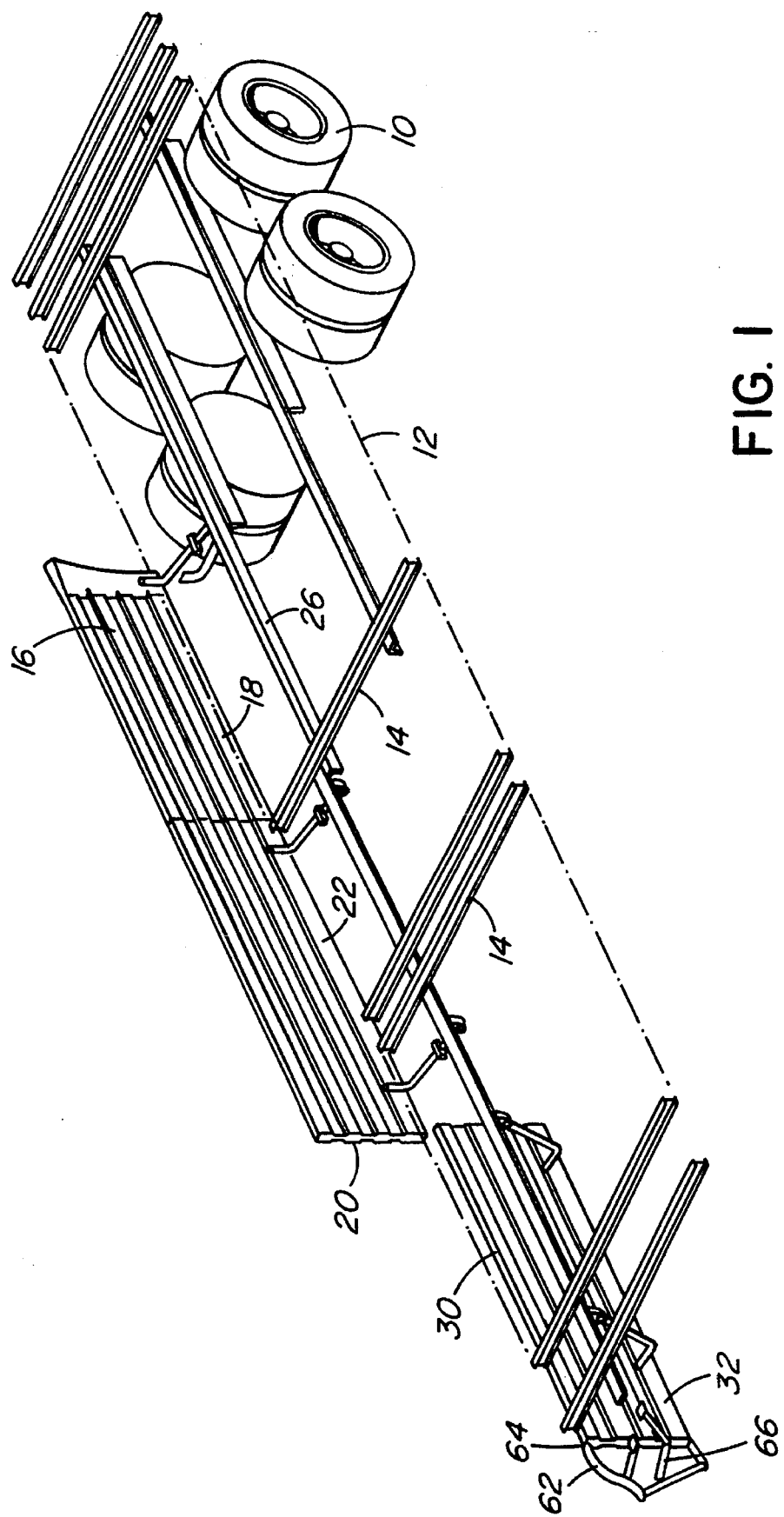
FIG. 1 is an isometric view of a fairing according to the present invention on a trailer, schematically shown.

FIG. 1 shows a trailer, generally illustrated by the wheels 10 the main chassis members 12, I-beams 14 and frame 26 upon which the rear wheel assembly is adjusted, that form part of a trailer. According to the invention there is a first member 30 with a first edge 32 hingedly attached to the trailer at its first edge 32. A second member 20 having a first edge 22 is also hingedly attached to the truck at the first edge 22. As shown particularly with reference to FIG. 4 the second member 22, the middle member, can receive the third member 16. To facilitate this the first member 30 is attached to a chassis comprising longitudinal mounting rail 28 mounted to a trailer. A third member 16 with a first edge 18 is attached to the travelling bracket 55 moving in conjunction with the trailer chassis.

Figure 3:
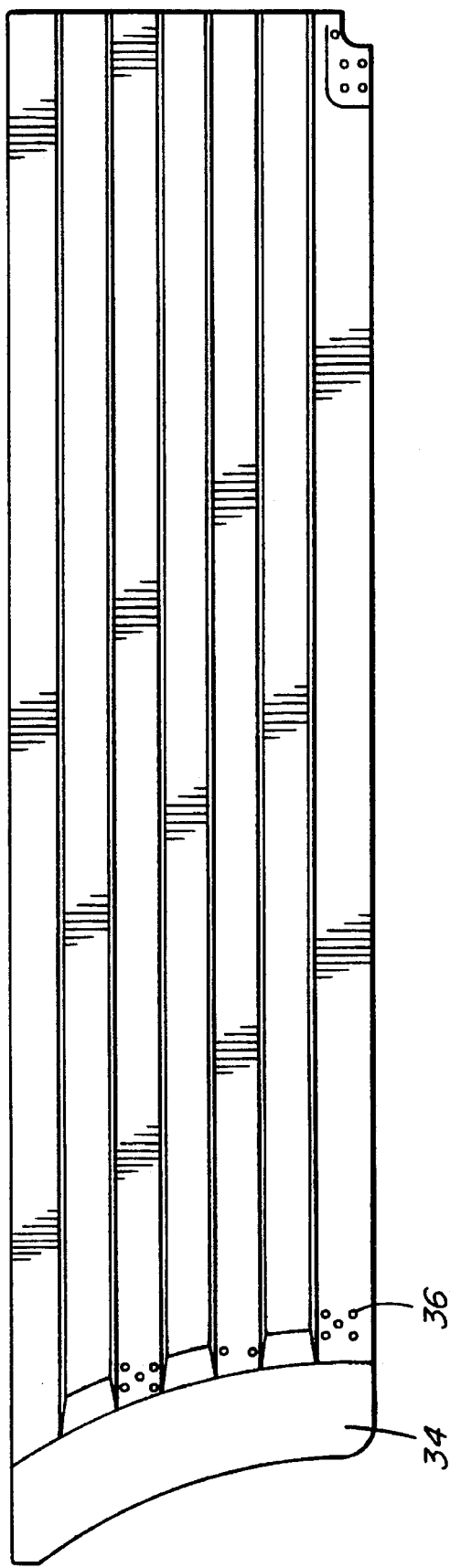
FIG. 3 is a side elevation of a fairing according to the present invention.
Figure 3A:
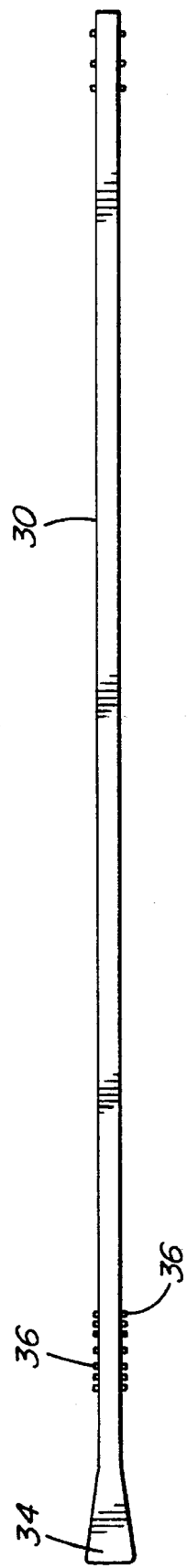
FIG. 3a is a plan view of the fairing of FIG. 3.
Figure 3B:
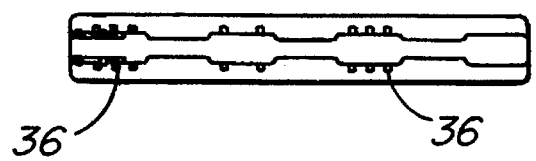
FIG. 3b is an end elevation of the fairing of FIG. 3.

A typical third member 16 is illustrated in FIGS. 3, 3a and 3b. There is a wide portion 34 at the leading edge of the fairing 30 and the fairing includes pegs 36 extending outwardly to facilitate the construction of the fairing from the integral first, second and third members.

Figure 4:
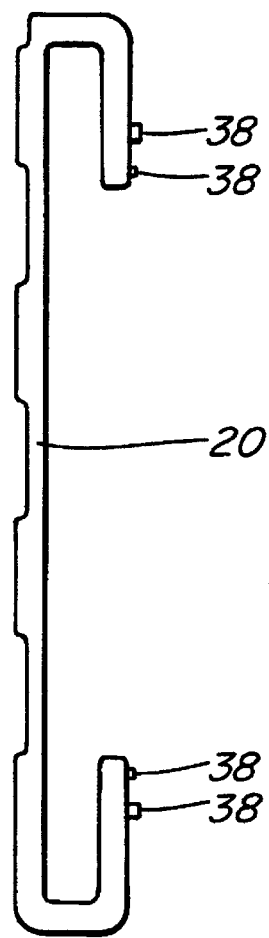
FIG. 4 is a sectional view of a second member useful in constructing the fairing of the present invention and which accommodates the telescoping third member.

As shown in FIG. 4 the second or middle member 20 is also formed with projections 38.

Figure 2:
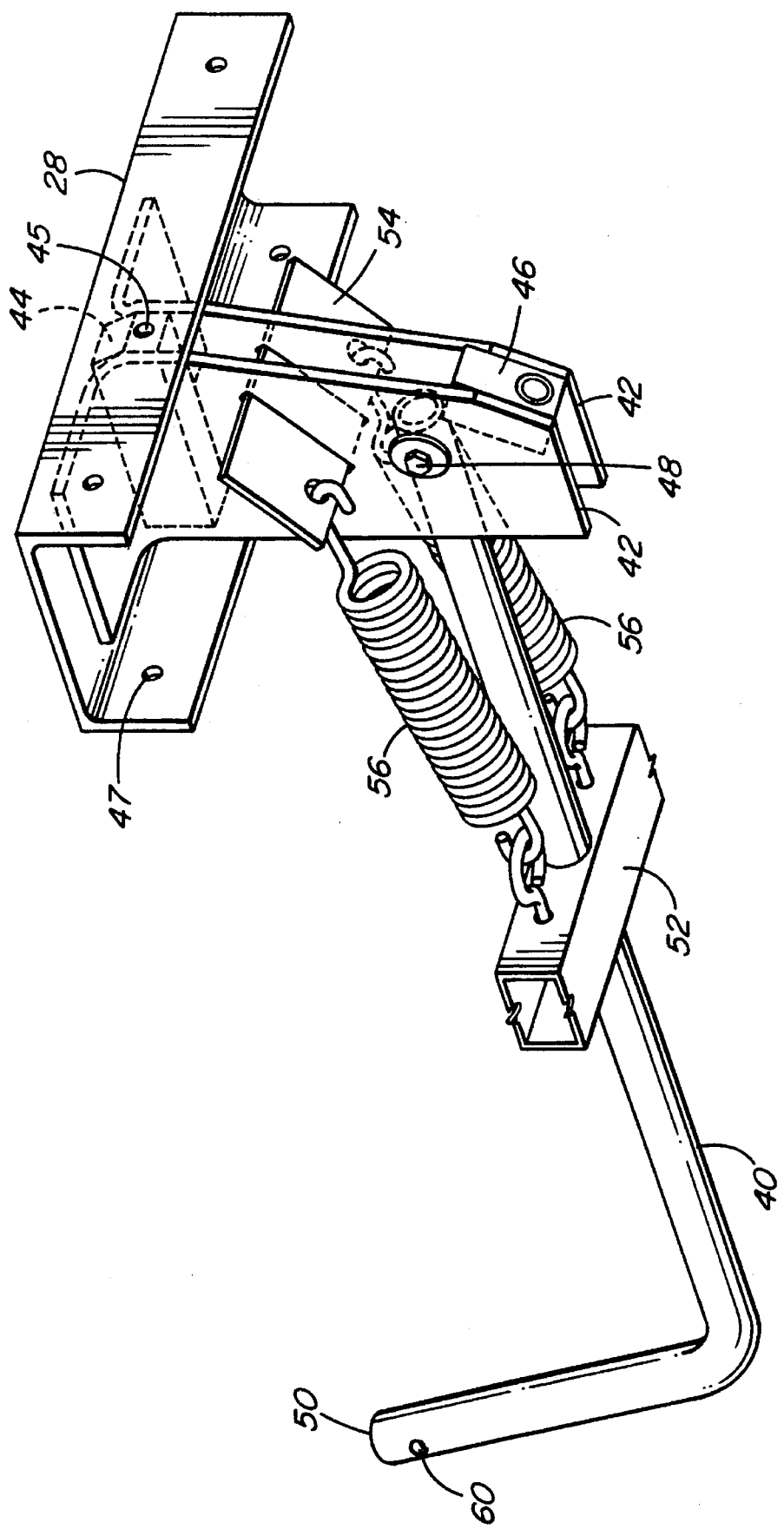
FIG. 2 is an isometric view of a hinge useful in mounting a fairing according to the present invention.

The first, second and third members 30, 20 and 16 are mounted by hinge joints to the mounting rail 28. A typical hinge joint is illustrated in FIG. 2. It comprises a pivot arm 40 mounted on the fairing support mounting rail 28 by spaced plates 42, the separation of which is controlled by an anchor block 44 and by an adjustment block 46. A pivot 48 extends through the plates 42 and through the arm 40 to allow pivoting of the arm 40. At its distal end 50 the arm is attached to a fairing member 16, 20 and 30 as shown in FIG. 1. The adjustment block 46 permits variation of the separation of the plates 42 and, thus, of the ease with which the arm 40, on which the fairing is mounted, may be pivoted.

Anchor straps 52 and 54 anchor springs 56 that act to hold the raised fairing in position. Springs 56 are at each side of each arm 40.

Plates 42, anchor block 44, adjustment block 46 and spring anchor plate 54 are an integral structure, usually welded together.

Mounting rails 28 act as channels to allow the hinge assembly to move longitudinally of the trailer. The hinge assembly can be moved to the desired position and locked in position by a pin engaging opening 45 in block 44 and an aligned opening 47 in mounting rail 28.

To use the fairing of the present invention the trailer must be modified to incorporate the mounting rail 28. These are permanently attached, for example by bolting to the trailer. The mounts, for example as shown in FIG. 2, are then mounted to mounting rail 28.

The mounting for the second member 20 allows the telescoping of the third member within the second. To this end the third member 16 is desirably provided with a roller to facilitate the telescoping movement.

Each arm 40 is attached to a corresponding panel 16, 22 or 30 adjacent its distal end 50 by a pin extending through opening 60 and engaging a simple bracket on the members 16, 20 or 30.

The first member 30 is provided with a nose panel 62 which pivots about the leading edge of the first member 30 by a vertical hinge 64 and controlled by brackets 66.

The present invention therefore provides a truck that can be provided with full fairings between the wheels with greatly increased fuel economy. Furthermore when it is necessary to work on the underside of the truck these fairings may be moved by simply pivoting them upwardly. Reduction of volume can also be achieved by telescoping the third member into the second. The third fairing member may also be moved and the first, second, and third members hinged, for example to manoeuvre the trailer over steep inclines, for example at loading berths.

Fuel economy tests were carried out using two identical tractor trailers, one equipped with fairings according to the present invention the other without the fairings. The tractors involved in towing the trailers were 1994 Mack Conventionals with Mack 350 H.P. engines. The trailer units were Fruehauf "A" Train Units.

The tests was conducted by comparing the performance of two tractors. Both vehicles used a Tripmaster tracking system to ensure data accuracy.

The two tractors were driven 179 miles over the same road, both trucks starting out within a minute of each other. The drivers set their cruise controls to 55 miles per hour to ensure proper comparative results. The units were identified as unit 376 and unit 377, unit 376 having no fairing and unit 377 being equipped with fairing according to the present invention. The fuel used was winter diesel.

| Results: | |
| --- | --- |
| Distance travelled (kilometres) | Unit 376-281 |
| | Unit 377-283 |
| Travel Time (hours) | Unit 376-3.00 |
| | Unit 377-2.59 |
| Fuel Used (litres) | Unit 376-106 |
| | Unit 377-89 |

It can therefore be seen that over a short distance a substantial fuel economy was achieved, unit 377 with a fairing, used 17 liters of fuel less than unit 376, which did not have fairing. This is over a very short distance by trucking standards, of 179 miles.

I claim:

1. A fairing for use on a trailer and comprising:

a first member having a first edge hingedly attached to said trailer at said first edge;

a second member having a first edge hingedly attached to said trailer at said second member first edge;

a third member having a first edge hingedly attached to said trailer at said third member first edge and arranged adjacent the second member, and telescopically receivable within said second member, said fairing being arranged along the lower edge of the trailer, adjacent the wheels.

2. A fairing as claimed in claim 1 in which said first, second and third members are attached to a hinge mounted to the truck by a mounting rail.

3. A fairing as claimed in claim 2 in which at least those portions of the hinged attachment carrying the first and second members are movable on the mounting rail.

4. A fairing as claimed in claim 1 in which the first, second and third members are mounted by hinge joints mounted on said mounting rail;

pivot arms pivotally attached to a hinge on the mounting rail and to the members, at a distal end.

5. A fairing as claimed in claim 1 in which the hinge comprises spaced plates on each side of said pivot arms;

a pivot extending through said plates and said arm to allow the pivoting of said arm.

6. A fairing as claimed in claim 5 in which the pivot is a bolt.

7. A fairing as claimed in claim 5 including a block between said plates.

* * * * *